No. 742,072. PATENTED OCT. 20, 1903.
P. SCHRECK.
LINING FOR REFRIGERATORS OR THE LIKE.
APPLICATION FILED NOV. 6, 1901.
NO MODEL.
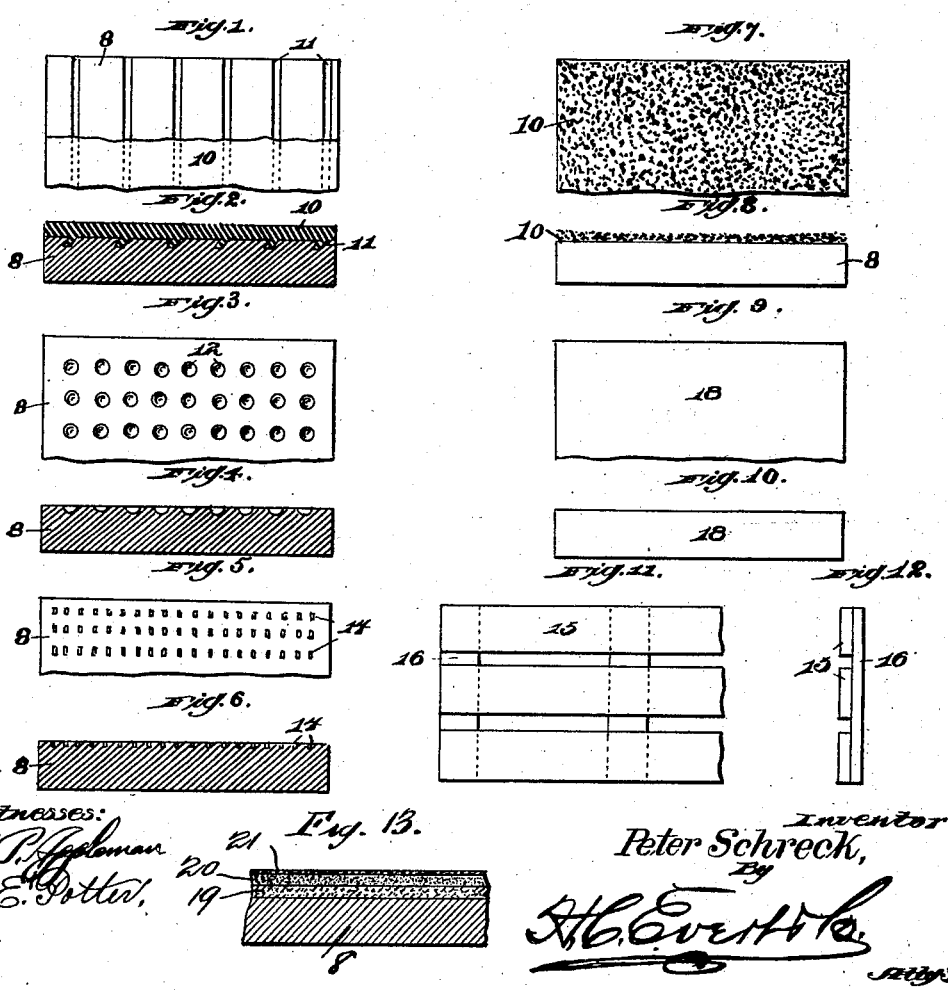

No. 742,072. Patented October 20, 1903.

UNITED STATES PATENT OFFICE.

PETER SCHRECK, OF PITTSBURG, PENNSYLVANIA.

LINING FOR REFRIGERATORS OR THE LIKE.

SPECIFICATION forming part of Letters Patent No. 742,072, dated October 20, 1903.

Application filed November 6, 1901. Serial No. 81,344. (No model.)

*To all whom it may concern:*

Be it known that I, PETER SCHRECK, a citizen of the United States of America, residing at Pittsburg, in the county of Allegheny and State of Pennsylvania, have invented certain new and useful Improvements in Linings for Refrigerators or the Like, of which the following is a specification, reference being had therein to the accompanying drawings.

My invention relates to an improvement on those linings which are used as inside surfaces or coverings for the walls of refrigerators, kitchen closets or cabinets, tubs, tanks, troughs, or the like; and its main object is to provide a lining impervious to water or moisture, as hereinafter described and claimed.

In order that my invention may be fully understood, I will proceed to describe it with reference to the accompanying drawings, in which—

Figure 1 is a plan view of a wood base for my lining having an anchoring-surface formed with inclined grooves. Fig. 2 is a transverse section thereof. Fig. 3 is a plan view of the base for my lining having semicircular depressions. Fig. 4 is a transverse section thereof. Fig. 5 is a plan view of the base for my lining having rectangular depressions. Fig. 6 is a transverse section thereof. Fig. 7 is a plan view of the base for my lining having my cement coating. Fig. 8 is a transverse section thereof. Fig. 9 is a plan view of a leather-board base for my lining. Fig. 10 is a transverse section thereof. Fig. 11 is a plan view of the base for my lining having spaced laths secured thereto. Fig. 12 is an end view of the same. Fig. 13 is a transverse section of my lining complete on a larger scale.

8 is a wooden base for the lining, having inclined grooves 11 and a coating 10 of cement filling said inclined grooves, so as to be interlocked with the base. Instead of the inclined grooves 11 I may provide the surface of the base with semicircular depressions 12, as shown in Figs. 3 and 4, or with rectangular depressions 14, as shown in Figs. 5 and 6, or with spaced laths 15, secured to strips 16, as shown in Figs. 11 and 12, or with a plain surface, as shown in Figs. 7 and 8.

In Figs. 9 and 10 I show a leather which may be substituted for the wooden base 8.

My coating 10 is shown in Fig. 13 and consists of an inner layer 19, composed of paint, rosin, and cement or varnish. After this layer is applied I apply an intermediate layer 20, composed of cement, potters' clay, whiting, alum, and sand, and finish with an outer layer 21 of varnish or paint.

My lining is adapted for use on new refrigerators, or for repairing old ones, or as a lining for ice-chests.

Having thus described my invention, the following is what I claim as new therein and desire to secure by Letters Patent:

A lining for refrigerators and the like comprising a base an inner layer composed of paint, rosin and cement, an intermediate layer composed of cement, potters' clay, whiting, alum, and sand, and an outer layer of varnish.

In testimony whereof I affix my signature in the presence of two witnesses.

PETER SCHRECK.

Witnesses:
 JOHN NOLAND,
 E. E. POTTER.